United States Patent
Kaden et al.

(10) Patent No.: US 7,950,419 B2
(45) Date of Patent: May 31, 2011

(54) CONDENSATE DRAINING PIPE FOR A HEATING, VENTILATING AND/OR AIR CONDITIONING SYSTEM AND METHOD FOR ASSEMBLING A CONDENSATE DRAINING PIPE

(75) Inventors: Olaf Kaden, Nieder-Hilbersheim (DE); Andreas Marutschke, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/390,026

(22) Filed: Feb. 20, 2009

(65) Prior Publication Data

US 2009/0211658 A1    Aug. 27, 2009

(30) Foreign Application Priority Data

Feb. 23, 2008    (EP) ..................................... 08003328

(51) Int. Cl.
    *F16L 11/00*      (2006.01)
(52) U.S. Cl. ........ 138/109; 138/155; 138/120; 285/374; 285/347; 285/332.3
(58) Field of Classification Search .............. 138/155, 138/120; 285/305, 374, 347, 133.21, 332.3, 285/921
See application file for complete search history.

(56) References Cited

U.S. PATENT DOCUMENTS

| | | | | |
|---|---|---|---|---|
| 3,199,307 A | | 8/1965 | Willis | 62/241 |
| 3,871,691 A | * | 3/1975 | Takagi et al. | 285/321 |
| 3,984,133 A | * | 10/1976 | Bird | 285/322 |
| 4,244,608 A | * | 1/1981 | Stuemky | 285/305 |
| 4,733,890 A | * | 3/1988 | Vyse | 285/148.14 |
| 5,052,725 A | * | 10/1991 | Meyer et al. | 285/308 |
| 5,104,158 A | * | 4/1992 | Meyer et al. | 285/308 |
| 5,123,677 A | * | 6/1992 | Kreczko et al. | 285/24 |
| 5,330,235 A | * | 7/1994 | Wagner et al. | 285/81 |
| 5,816,625 A | * | 10/1998 | Clarke | 285/305 |
| 6,231,089 B1 | * | 5/2001 | DeCler et al. | 285/308 |
| 7,365,207 B2 | * | 4/2008 | Puentener et al. | 548/235 |

FOREIGN PATENT DOCUMENTS

| | | |
|---|---|---|
| DE | 9406337 U1 | 6/1994 |
| EP | 1645447 A1 | 4/2006 |
| FR | 2825951 A1 | 12/2002 |
| JP | 2000158937 A | 6/2000 |

OTHER PUBLICATIONS

European Paten Office, European Search Report for European Application No. 08003328.5, Jul. 30, 2008.

* cited by examiner

*Primary Examiner* — Patrick F Brinson
(74) *Attorney, Agent, or Firm* — Ingrassia Fisher & Lorenz, P.C.

(57) ABSTRACT

A condensate draining pipe is provided for a heating system, a ventilating system, and/or an air conditioning (HVAC) system that includes, but is not limited to a condensate feed portion and a condensate drain portion. The condensate feed portion and the condensate drain portion are connectable to one another by a press-fit coupling assembly comprising an O-ring seal.

26 Claims, 8 Drawing Sheets

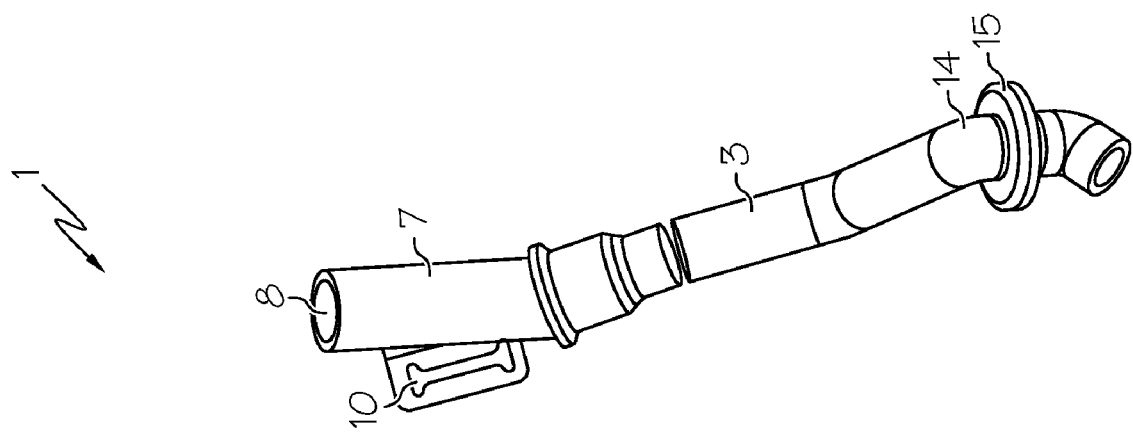
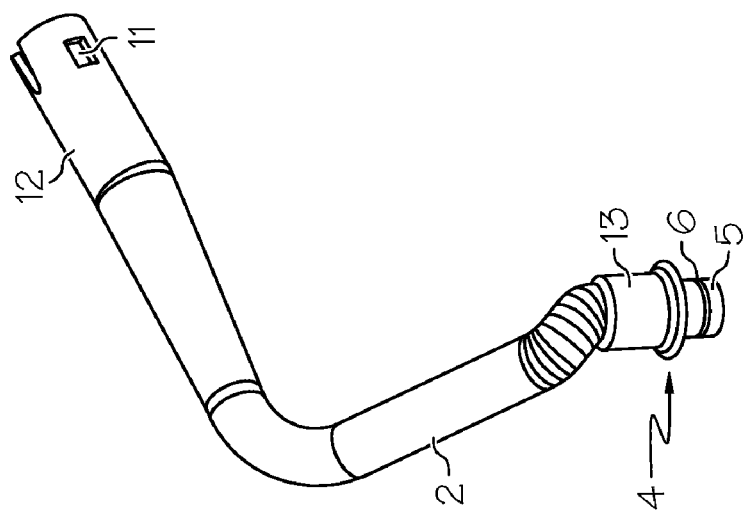
FIG. 1

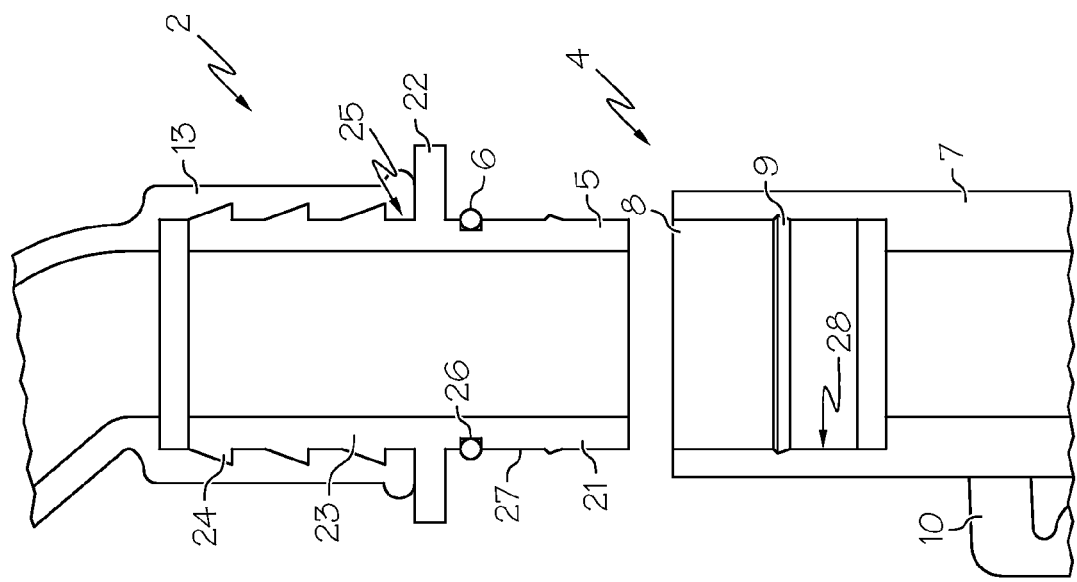
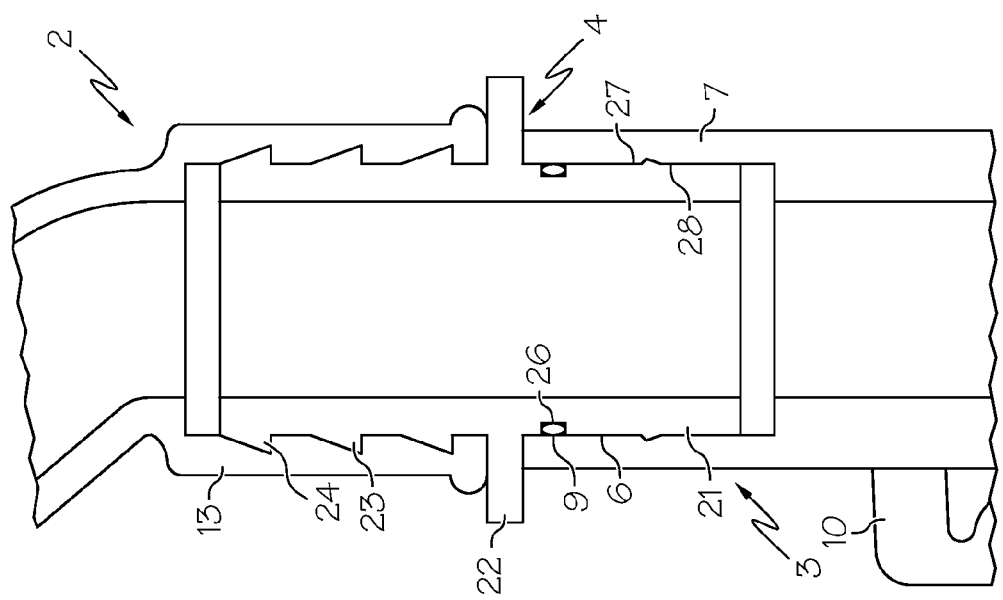

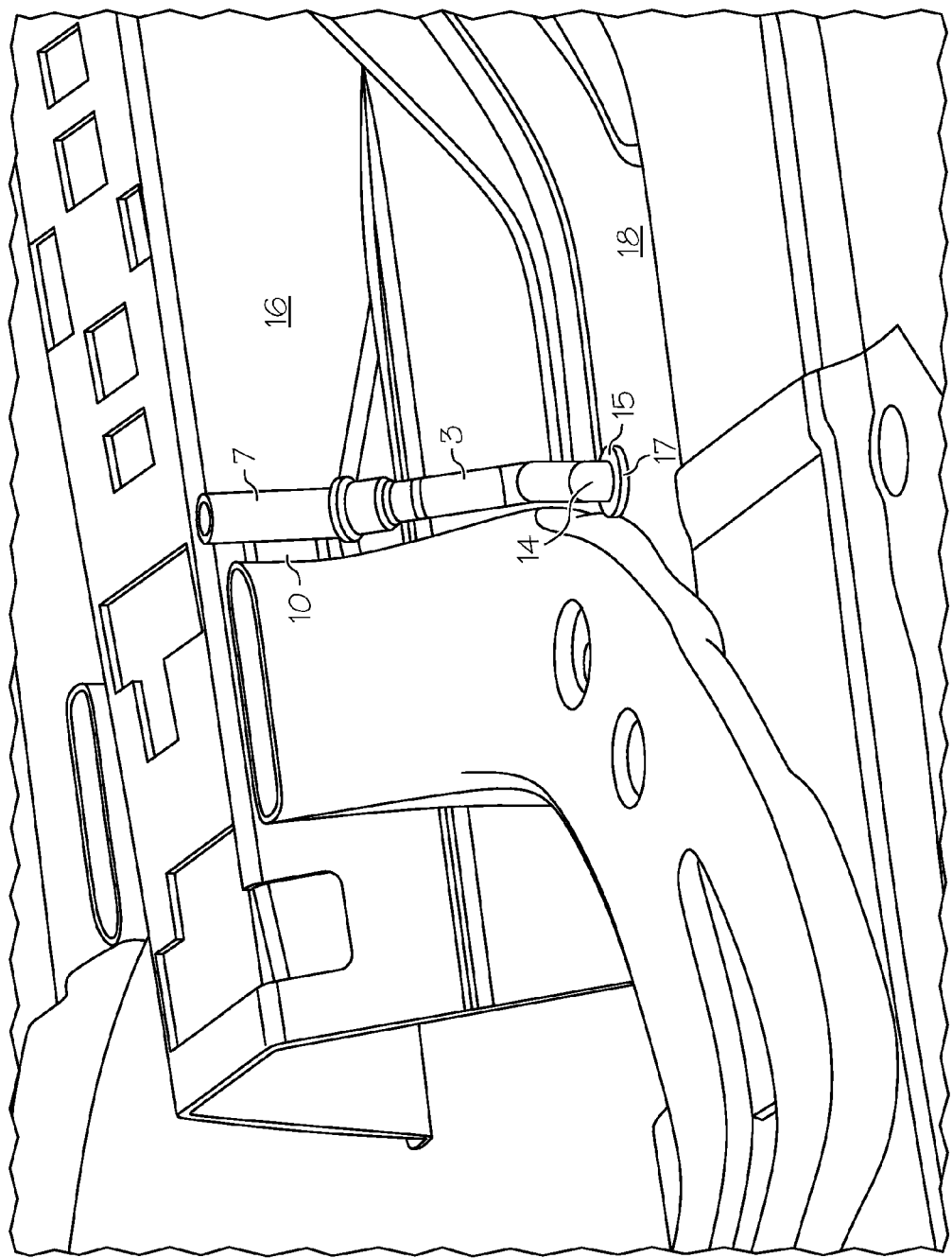

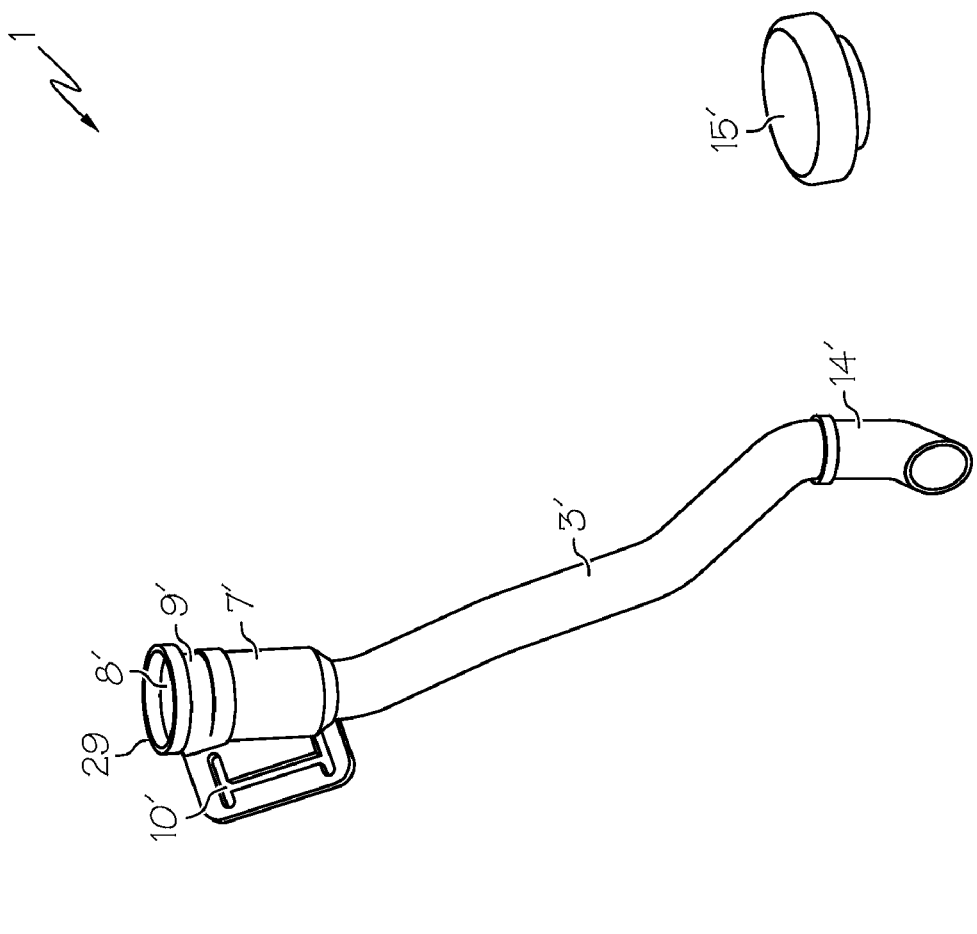
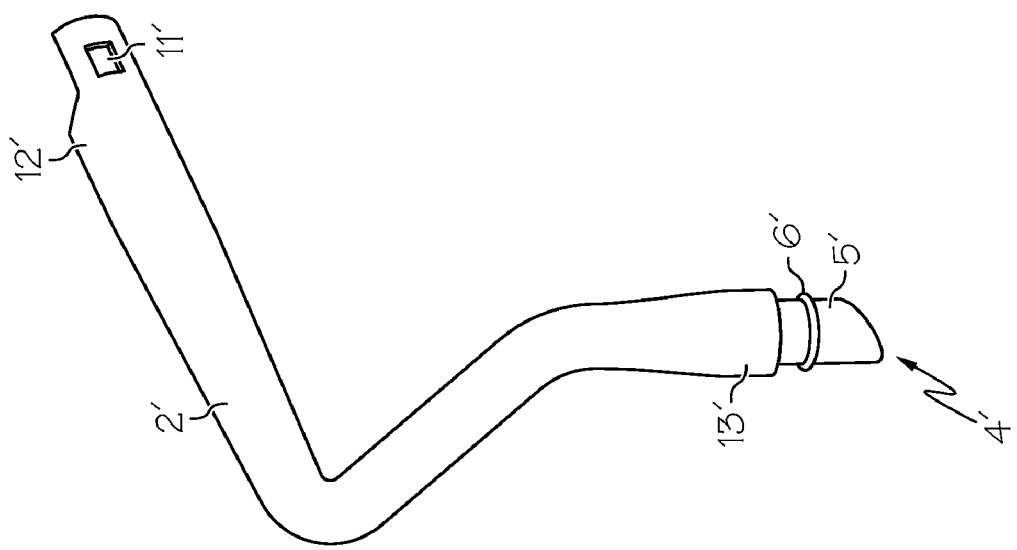
FIG. 8

CONDENSATE DRAINING PIPE FOR A HEATING, VENTILATING AND/OR AIR CONDITIONING SYSTEM AND METHOD FOR ASSEMBLING A CONDENSATE DRAINING PIPE

CROSS-REFERENCE TO RELATED APPLICATION

This application claims priority to European Patent Application No. 08003328.5-2423, filed Feb. 23, 2008, which is incorporated herein by reference in its entirety.

TECHNICAL FIELD

The invention relates to a condensate draining pipe for a heating, ventilating and/or air conditioning (HVAC) system, for example, of an automotive vehicle and to a method for assembling a condensate draining pipe of a HVAC system.

BACKGROUND

The heating, ventilating and/or air conditioning system of, for example, an automotive vehicle typically includes a draining tray positioned underneath the evaporator to collect the condensate water which is formed on the evaporator during operation of the system. The condensate water which collects in the tray is drained away through a condensate draining hose which extends from the tray to a draining hole provided in, for example, the floor of the vehicle which communicates with the exterior.

A condensate draining hose for a vehicle air-conditioning system which comprises a rigid portion which extends through the vehicle wall and a co-molded elastomeric portion having an end portion shaped for connection to the tray of the air conditioning system is known from EP 1 645 447 B1. However, this monolithic condensate draining hose has the disadvantage that it is complicated to fit into the vehicle.

It is, therefore, at least one object of the present invention to provide a condensate draining hose that can be fitted into a vehicle more simply. In addition, other objects, desirable features, and characteristics, will become apparent from the subsequent summary and detailed description, and the appended claims, taken in conjunction with the accompanying drawings and this background.

According to an embodiment of the invention, a condensate draining pipe for a heating, ventilating and/air conditioning system is provided which comprises a condensate feed portion and a condensate drain portion. The condensate feed portion and the condensate drain portion are connectable to one another by a press-fit coupling assembly which comprises an O-ring seal.

The condensate draining pipe comprises two pieces which are connectable to one another by a press-fitting coupling assembly. A two-piece draining pipe has the advantage that the two pieces may be fitted into the vehicle at different stages in the assembly line. Therefore, a greater degree of flexibility is provided which can reduce the costs of producing the vehicle.

A press-fit coupling has the advantage that the two pieces can be connected together by a simple press fitting procedure which can be performed without particular tools. This further simplifies the assembly of the condensate draining pipe in the vehicle.

The O-ring seal is resilient and may comprise rubber, for example. The O-ring seal has the advantage that a detachable press-fit connection is provided. The condensate feed portion and the condensate drain portion of the condensate draining pipe may detachedly connected to one another which simplifies maintenance and repair of the HVAC system. The O-ring seal provides a cylindrical interference fit between the two pieces of the condensate draining pipe.

In an embodiment, the press-fit coupling assembly comprises a shaft fitting and a sleeve flange fitting. The shaft fitting is able to be accommodated within the sleeve flange fitting.

To join the two pieces of the condensate draining pipe, that is the condensate feed portion and the condensate drain portion, the press-fit coupling assembly is assembled so that the O-ring seal is compressed between an outer surface of the shaft fitting and an inner surface of the sleeve flange fitting.

In an embodiment, the shaft fitting is provided by an end of the condensate feed portion and comprises a nozzle shaped end of the condensate feed portion of the draining pipe. An end of the condensate draining portion may provide the sleeve flange fitting. The sleeve flange fitting is, in an embodiment, integral with the condensate drain portion which has the advantage of reducing the number of joints.

The condensate feed portion may further comprise a feed flange which is adapted to be connected to a condensate drain flange of the HVAC module of the HVAC system. The condensate drain flange may be a portion of the draining tray of the HVAC.

The feed flange of the condensate feed portion of the draining pipe may further comprise latching means for detachedly attaching the condensate feed portion to the condensate drain flange of the HVAC module. The latching means may comprise at least one opening positioned in the condensate feed portion for accommodating a resilient snap action hook protruding from the drain flange of the HVAC module.

The condensate drain portion may further comprise a draining outlet nozzle through which the condensate is drained away. In further embodiment, the condensate draining pipe further comprises a bushing adapted to accommodate the drain nozzle of the compensate drain portion. The bushing is adapted to hold the drain nozzle of the draining pipe in the opening positioned in the vehicle body panel. The bushing may also have a sound insulation as well as a sealing function.

To further improve the seal of the press-fit coupling assembly, the sleeve flange fitting and/or the shaft fitting may comprise a groove for accommodating the O-ring seal. A groove has the advantage that the O-ring seal is held in the desired position within the press-fit coupling assembly. Furthermore, the cross-sectional area of the interface between the O-ring seal and the shaft fitting and sleeve flange fitting is increased which may further improve the reliability of the seal.

In a further embodiment, the condensate draining pipe further comprises a height adjustment fixing. The fixing enables the draining pipe to be attached to another component in a desired position. The fixing may be provided in the form of a height adjustment fixing so that the position of the draining pipe may be adjusted so as to allow for variations in manufacturing tolerance. In an embodiment, the height adjustment fixing comprises a slot fixing.

In an embodiment of the invention, the height adjustment fixing is attached to the condensate draining portion and, in a further embodiment, is attached to the sleeve flange.

The further embodiments, the condensate feed portion is flexible and the condensate draining portion and the shaft fitting are rigid. In this case, the condensate drain portion may be pre-assembled into the vehicle and the condensate feed portion fitted afterwards. The flexibility of the condensate feed portion can be useful during the fitting when arranging the condensate feed portion in position and connecting it to the pre-mounted condensate drain portion by the press-fit coupling assembly.

In a further embodiment, the condensate feed portion comprises a flexible compensating portion arranged adjacent the press-fit coupling assembly. The flexible portion may be provided by a portion of the pipe having a bellows form. This enables differences in the size and arrangement of the condensate draining pipe to be compensated so that the two separate pieces of the condensate draining pipe can be fitted together and a sealed joint be provided by the press-fit coupling assembly.

The resilient O-ring is compressed between the rigid shaft fitting and the rigid sleeve flange fitting of the condensate draining portion to provide a seal and a detachable press-fit between the condensate feed portion and the condensate draining portion of the draining pipe.

The condensate feed portion and condensate drain portion of the draining pipe may each have a form which is adapted to fit a desired route of the draining pipe within the vehicle. Each portion has a tubular form. However, the cross-section of each portion is not necessarily circular and may vary along the length in order that the condensate draining pipe is better adapted to the available space.

Furthermore, the two portions may also have a form and length so that the press-fit coupling assembly through which the two portions are connected to one another is arranged in a particular location within the vehicle. This location can be chosen so as to simplify the fitting of the draining pipe into the vehicle.

In an embodiment, the condensate feed portion extends between the HVAC module and a centre console of the vehicle. The condensate drain portion extends from the centre console centre console the vehicle to an opening in the body panel of the vehicle through which the condensate can drain away to the exterior. The coupling assembly is, therefore, arranged in the region of the centre console of the vehicle.

In further embodiment of the invention, at least a part of the condensate drain portion is integral with a portion of the vehicle bodywork. This has the advantage that the space occupied by the condensate drain portion of the draining pipe can be more closely adapted to the form of the vehicle bodywork. Therefore, it is possible to arrange the condensate drain portion so as to be less visually noticeable. The condensate drain portion may be an integral part of a cast or injection molded portion of the vehicle bodywork. A section of the condensate drain portion may be integral with a foot well or with the centre console of the vehicle, for example.

The invention also provides a method for assembling a condensate draining pipe of a heating ventilating and/or air conditioning system, the condensate draining pipe comprising a condensate feed portion and a condensate drain portion connectable to one another by a press-fit coupling assembly. According to the invention, the condensate drain portion is mounted before the condensate feed portion is connected to the condensate drain portion by the press-fit coupling assembly.

The condensate drain portion is, therefore, pre-mounted in, for example, the vehicle and the condensate feed portion may be mounted into the vehicle at a later stage in the assembly line. This has the advantage that sound insulation and/or carpet may be placed on top of the condensate drain portion rather than the draining pipe having to be inserted through a hole provided in the pre-fitted sound insulation and/or carpet in order that the pipe is fitted into the opening in the car bodywork.

The condensate feed portion may be provided with a shaft fitting and the condensate drain portion may be provided with a sleeve flange. In this embodiment, the shaft fitting is inserted into the sleeve flange fitting to provide the press-fit coupling assembly connecting the condensate drain portion and the condensate feed portion.

In a further embodiment, an O-ring seal is provided and the press-fit coupling is sealed by positioning the O-ring seal between the shaft fitting and the sleeve flange fitting.

The condensate feed portion may be connected to the condensate drain portion by compressing the O-ring seal between an outer surface of the shaft fitting and an inner surface of the sleeve flange fitting.

The condensate drain portion may be pre-mounted by mounting it on a portion of the vehicle bodywork. The condensate drain portion can have a form and be positioned such that the press-fit coupling assembly is arranged at an edge of the sound insulation and/or carpet. Therefore, a one piece carpet without a hole or slot in the centre for the draining pipe may be used. For example, if the coupling assembly is arranged at the centre console of the vehicle, the sound insulation and/or carpet may include a cutout in its edge which abuts the centre console in which the sleeve flange of the condensate draining portion is exposed.

Pre-mounting the draining portion of the draining pipe enables it to be hidden away under sound insulation and/or carpet therefore improving the visual look of the vehicle interior.

BRIEF DESCRIPTION OF THE DRAWINGS

The present invention will hereinafter be described in conjunction with the following drawing figures, wherein like numerals denote like elements, and.

FIG. 1 illustrates two sections of the condensate draining pipe unassembled according to a first embodiment of the invention;

FIG. 3 illustrates a detailed view of the coupling assembly connecting the two sections of the condensate draining pipe of FIG. 1 and FIG. 2;

FIG. 4 illustrates the pre-mounting of a condensate draining portion of the condensate draining pipe in an automotive vehicle;

FIG. 8 illustrates a condensate draining pipe according to a second embodiment of the invention.

DETAILED DESCRIPTION

The following detailed description is merely exemplary in nature and is not intended to limit application and uses. Furthermore, there is no intention to be bound by any theory presented in the preceding background and summary or the following detailed description.

Figure 2:
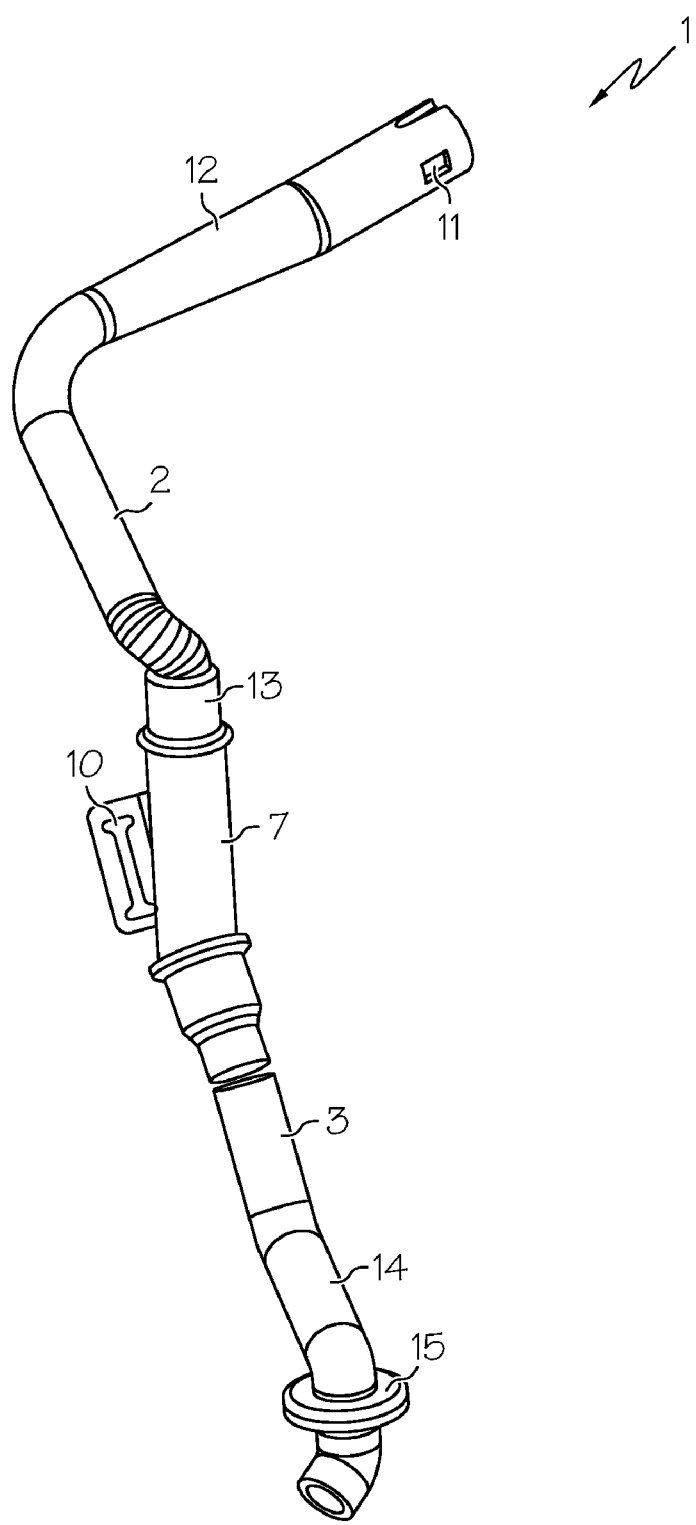
FIG. 2 illustrates the two sections of the condensate draining pipe of FIG. 1 when assembled according to a first embodiment of the invention.

FIG. 1 and FIG. 2 illustrate the components of a condensate draining pipe 1 of a heating, ventilating and/or air conditioning (HVAC) system of an automotive vehicle according to a first embodiment of the invention. The components are illustrated unassembled in FIG. 1 and assembled in FIG. 2.

The condensate draining pipe 1 comprises two separate pieces, a condensate feeding portion 2 and a condensate draining portion 3 each having a generally pipe form. The condensate feed portion 2 and the condensate draining portion 3 are connectable to one another by a coupling assembly 4 to provide the condensate draining pipe 1.

The coupling assembly 4 provides a press-fit joint which enables the two separate condensate feed portions 2, 3 of the condensate draining pipe 1 to be detachedly connected to one another. The coupling assembly 4 comprises a shaft fitting 5, an O-ring seal 6 and a sleeve flange fitting 7 and is illustrated in more detail in FIG. 3.

The shaft fitting 5 is provided in the form of a tubular nozzle which forms an end of the condensate feed portion 2 of the condensate draining pipe 1. The nozzle has an outer diameter which is smaller than the outer diameter of the body of the condensate feed portion 2. The O-ring seal 6 is illustrated in FIG. 1 and FIG. 3b arranged around the outer surface of the nozzle 5 providing the shaft fitting 5. The sleeve flange fitting 7 is provided as a widened end 8 of the condensate draining portion 3.

The sleeve flange fitting 7 and the shaft fitting 5 are rigid whereas the O-ring seal 6 is resilient. The sleeve flange fitting 7 and the shaft fitting 5 may be formed from a rigid plastic and the O-ring seal may be rubber.

In the assembled condition illustrated in FIG. 2 and FIG. 3a, the shaft fitting 5 is accommodated within the sleeve flange fitting 7 at the distal end 8 of the condensate draining portion 3 such that the O-ring 6 is compressed between the outer surface of the shaft fitting 5 and the inner surface of the sleeve flange fitting 7. The sleeve flange fitting 7 also includes an annular groove 9 on its inner surface for accommodating the O-ring seal 6 when the coupling assembly 4 is in the assembled condition, as illustrated in FIG. 3a.

The condensate draining pipe 1 further includes a height adjustment fitting 10 which extends from the sleeve flange fitting 7. The height adjustment fitting 10 is a slot fitting thus enabling the position of the condensate draining portion 3 to be adjusted.

The opposing end 12 of the condensate feed portion 2 is adapted to be connected to the draining flange of a non-illustrated HVAC module. The condensate feed portion 2 includes a latching means 11 towards the opposing end 12 of the condensate feed portion 2. This latching means is provided in the form of an opening in which a resilient snap action hook of the HVAC module can be accommodated.

In this embodiment, the condensate feed portion 2 has a generally pipe form and includes a first bend through about 90° and a second bend of about 120° so that when the shaft fitting 5 is in a generally vertical direction, the opposing feed end 12 is in a generally horizontal position. The form of the condensate feed portion 2 is chosen so that it is accommodated in the desired position within the vehicle.

The condensate draining portion 3 of the condensate draining pipe 1 also includes a number of bends and turns ending in a draining end 14 which is adapted to be accommodated in an opening positioned in a body panel of the vehicle.

The condensate draining pipe 1 may further include a bushing 15 for coupling the draining end 14 with the opening in the vehicle body panel. The bushing 15 has a generally annular form. When assembled, the draining end 14 of the condensate draining portion 3 is accommodated in the through hole of the bushing 15.

In use, condensate from the HVAC module enters the condensate draining pipe 1 at the feed end 12 of the condensate feed portion 2, flows through the condensate feed portion 2, the coupling assembly 4 and the condensate draining portion 3 and exits the draining end 14 to flow to the exterior of the vehicle.

FIG. 3 illustrates the press-fit coupling assembly 4 in partial cross-sectional form. The shaft fitting 5 comprises a distal end portion 21 and annular protruding flange portion 22 and a connection portion 23 which comprises a plurality of annular ribs 24 protruding from the outer surface 25 of the shaft fitting 5. The annular protruding flange portion is positioned between the distal end portion 21 and the connection portion 23.

The distal end portion 21 of the shaft fitting 5 further comprises an annular groove 26 adapted to accommodate the O-ring 6. The groove 26 and the O-ring 6 are positioned in the distal end portion 21 adjacent the annular protruding flange 22. The shaft fitting 5 is connected to the body 13 of the condensate feed portion 2 by a radial compression fit between outside of the rigid connection portion 23 comprising the ribs 24 and the inside surface of the flexible material of the body portion 13 of the condensate feed portion 2 to provide a sealed connection.

FIG. 3a illustrates the press-fit coupling assembly 4 in the assembled condition. In the assembled condition, the O-ring 6 is compressed between the outer surface 27 of the shaft fitting 5 and the inner surface 28 of the sleeve flange fitting 7 to provide a seal. The O-ring 6 is positioned in the groove 9 and groove 26 of the sleeve flange fitting 7 and shaft fitting 5, respectively. The annular protruding flange 22 of the shaft fitting 5 is in contact with the distal end 8 of the sleeve flange fitting 7. The fitting of the condensate draining pipe 1 into a vehicle is illustrated in FIG. 4 to FIG. 7.

According to an embodiment of the invention, the condensate draining portion 3 of the condensate draining pipe 1 is pre-mounted in the vehicle, as illustrated in FIG. 4. The condensate draining portion 3 extends between the centre console 16 of vehicle and an opening 17 positioned in the floor panel 18 of the vehicle. The bushing 15 couples the draining end 14 to the opening 17. FIG. 4 also illustrates that the sleeve flange fitting 7 of the condensate draining portion 3 is fixed by the height adjustment fixing 10 to the centre console 16 of the vehicle.

Figure 5:
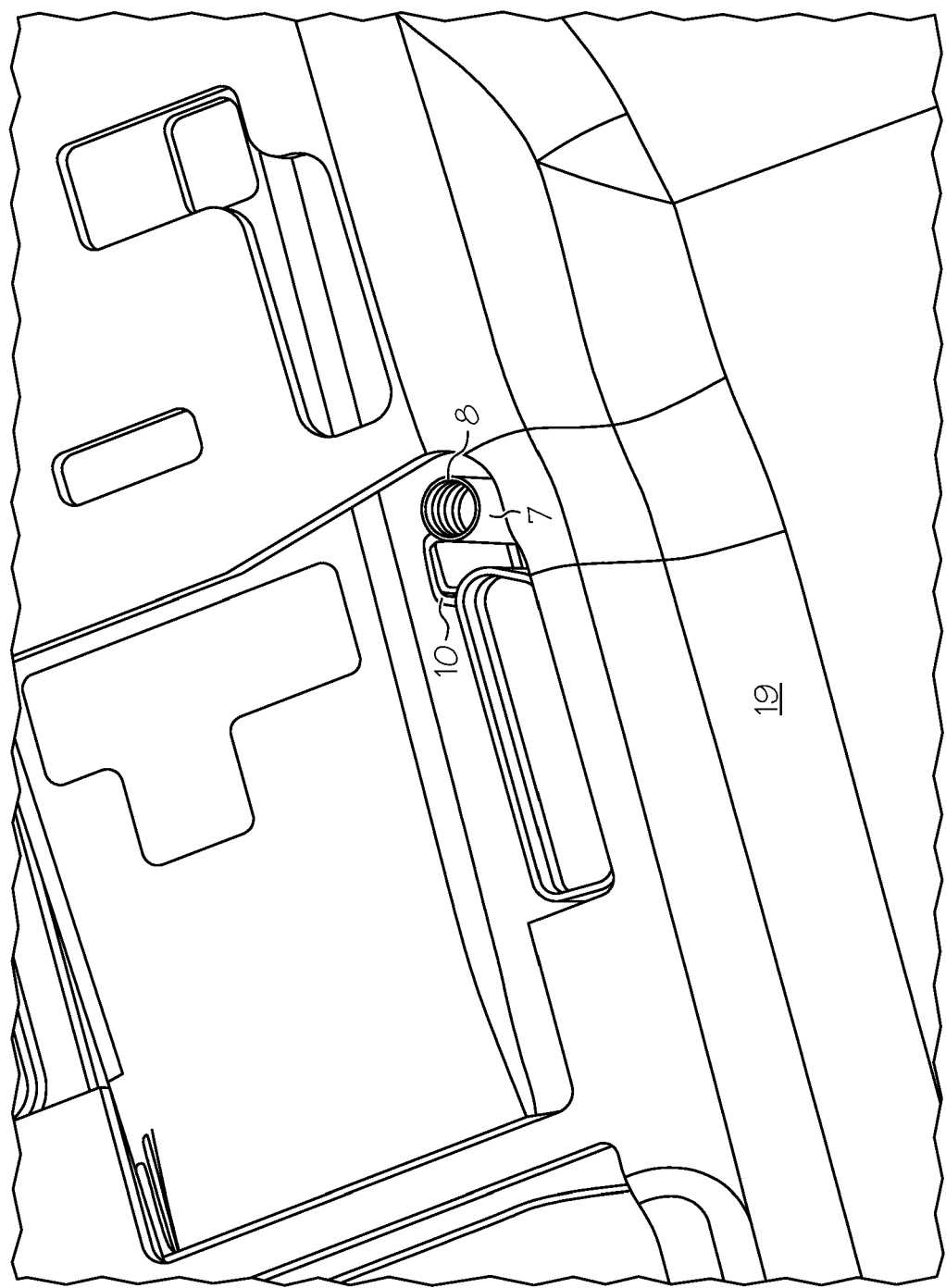
FIG. 5 illustrates the fitting of sound insulation over the condensate draining portion in an automotive vehicle.

FIG. 5 illustrates the fitting of sound insulation and carpet 19 in the vehicle. In particular, the sound insulation and carpet 19 is fitted over the condensate draining portion 3 of the condensate draining pipe 1 so that only the end of the sleeve flange fitting 7 is exposed. The remaining areas of the condensate draining portion 3 are covered by the sound insulation and carpet 19.

After the condensate draining portion 3 and after the carpet 19 is fitted into the vehicle, the condensate feed portion 2 of the condensate draining pipe 1 is fitted. The feed end 12 of the condensate feed portion 2 may be first attached to the HVAC drain flange of the HVAC module and these connected components fitted into the vehicle.

Figure 6:
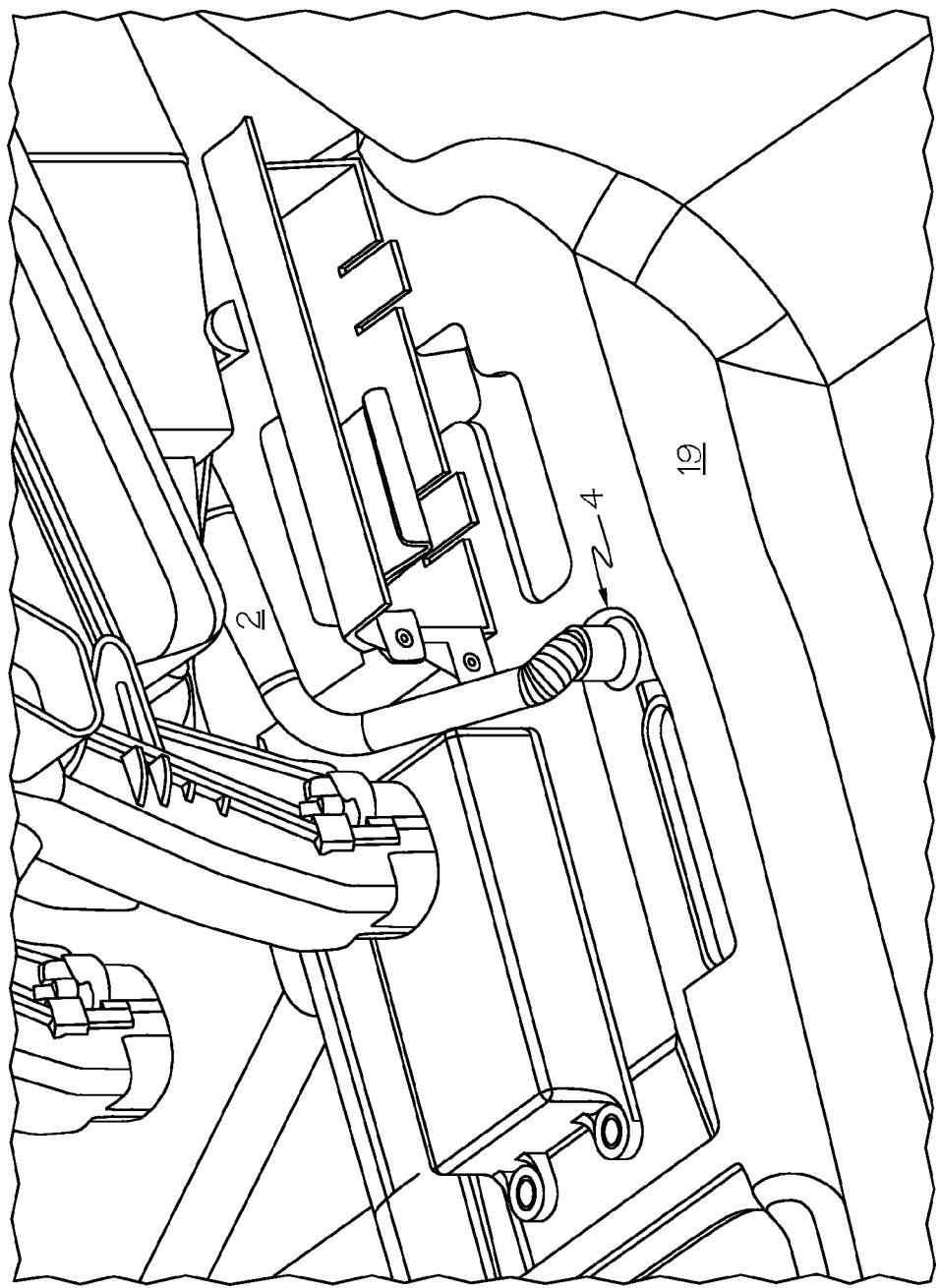
FIG. 6 illustrates the fitting of a condensate feed portion and its connection to the condensate draining portion in an automotive vehicle.
Figure 7:
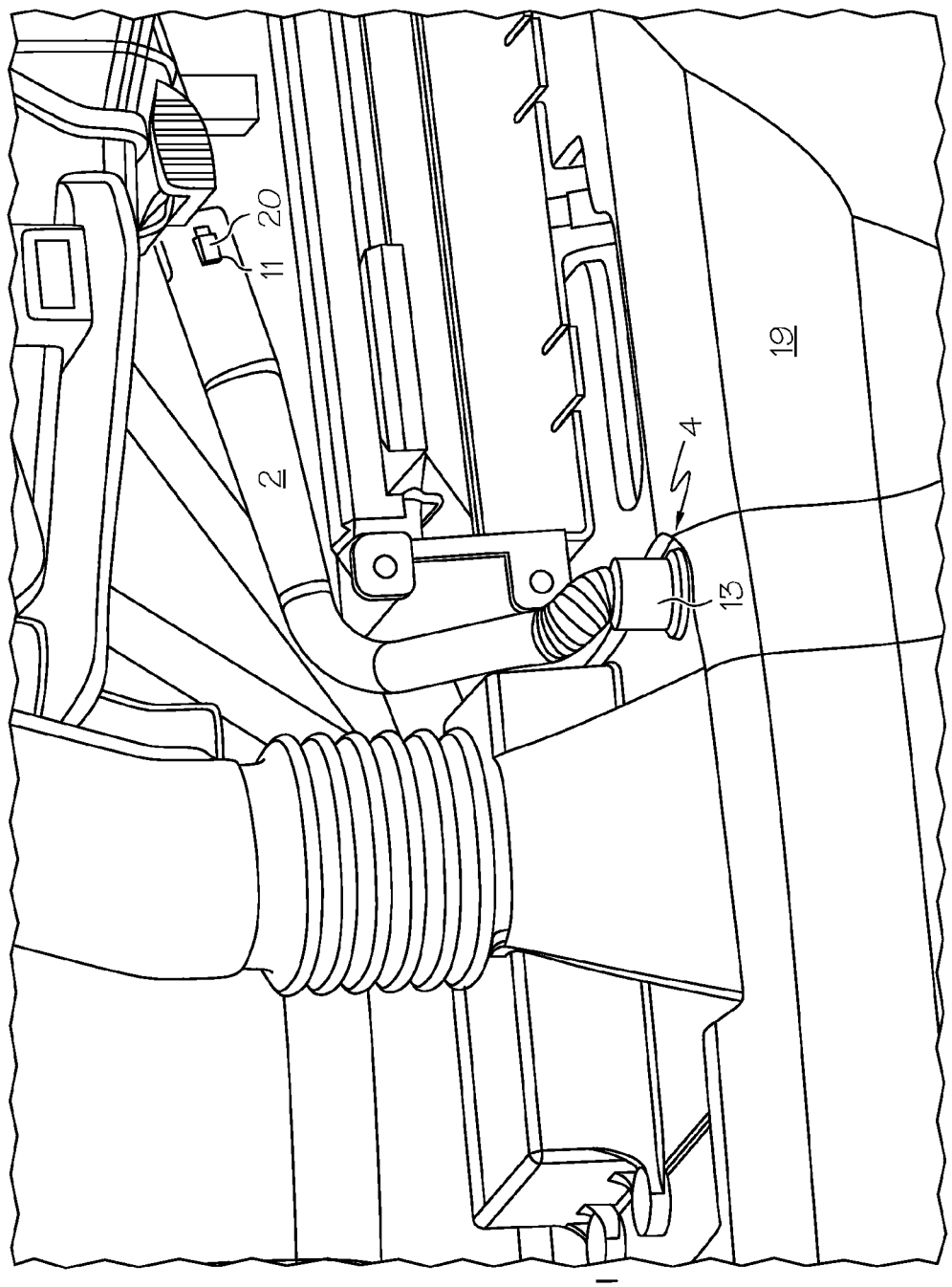
FIG. 7 illustrates a second view of the assembled condensate draining pipe in an automotive vehicle.

FIG. 6 and FIG. 7 illustrate different views of the connection of the condensate feed portion 2 to the pre-mounted condensate drain portion by means of the press-fit coupling assembly 4.

FIG. 6 illustrates the feed flange end 12 of the condensate feed portion 2 of the condensate draining pipe 1. The resilient snap action hook 20 of the HVAC module is engaged with the opening 11 positioned in the feed end 12 of the condensate draining portion 3 as illustrated in FIG. 7. After the feed flange end 12 of the condensate feed portion 2 has been connected to the HVAC module, the shaft fitting 5 is pressfitted into the sleeve flange fitting 7 of the condensate draining portion 3.

FIG. 7 illustrates the connection of the shaft fitting 5 with the sleeve flange fitting 7. This is achieved by press fitting the shaft fitting 5 with the O-ring seal 6 positioned around its outer surface into the sleeve flange fitting 7. The O-ring seal 6 is accommodated within the annular groove 9 such that it is compressed between the outer surface of the shaft fitting 5 and the inner surface of the sleeve flange fitting 7 thus providing a seal preventing leakage of the condensate flowing through the coupling assembly 4 and connecting the condensate feed portion 2 to the condensate draining portion 3.

Condensate from the HVAC module enters the feed flange end 12 of the condensate feed portion 2 of the condensate draining pipe 2, flows through the condensate feed portion 2, the condensate draining portion 3 and exits the vehicle through the draining end 14.

FIG. 8 illustrates a condensate draining pipe 1 with a press-fit coupling assembly 4' according to a second embodiment or the invention. In the second embodiment of the invention, the end of the tubular nozzle of the shaft fitting 5' is formed at an inclined angle so as to better guide the condensate into the condensate drain portion 3'. The sleeve flange fitting 7' is provided as a widened and slightly flared end of the condensate draining portion 3'.

Furthermore, the distal end 8' of the sleeve flange fitting 7' has a mounting cup 29 which is adapted to accommodate the body 13' of the condensate feed portion 2' adjacent the shaft fitting 5'. The assembled condition, the distal end of the body 13' of the condensate feed portion 2' is positioned within the mounting cup 29. A mounting cup 29 can grip the outer surface of the body 13' of the condensate feed portion 2'.

In a non-illustrated embodiment, the condensate drain portion is provided at least along part of its length as an integral part of a further component of the vehicle. For example, the condensate drain portion may be provided as a tube or duct formed in the wall of the centre console and floor of the vehicle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A condensate draining pipe for at least one of a heating system, a ventilating systems, or air conditioning (HVAC) system, comprising:
    a condensate feed portion;
    a condensate drain portion; and
    a press-fit coupling assembly comprising an O-ring that connects the condensate feed portion and the condensate drain portion, a shaft fitting coupled to an end of the condensate feed portion, and a sleeve flange fitting comprising a groove in an inner surface thereof for accommodating a seal of the O-ring, the sleeve flange fitting provided by the condensate drain portion.

2. The condensate draining pipe according to claim 1, wherein a seal of the O-ring provides a cylindrical interference fit.

3. The condensate draining pipe according to claim 1, wherein the press-fit coupling assembly and a seal of the O-ring is compressed between an outer surface of a shaft fitting and an inner surface of a sleeve flange fitting.

4. The condensate draining pipe according to claim 1, wherein the shaft fitting is provided by a nozzle of the condensate feed portion.

5. The condensate draining pipe according to claim 1, wherein the condensate feed portion further comprises a feed flange adapted for connection to a condensate drain flange of a HVAC module of the air conditioning (HVAC) system.

6. The condensate draining pipe according to claim 5, wherein the feed flange comprises a latch adapted to detachedly attach the condensate feed portion to the condensate drain flange of the HVAC module.

7. The condensate draining pipe according to claim 6, wherein the latch comprises at least one opening positioned in the condensate feed portion for accommodating a resilient snap-action hook of the HVAC module.

8. The condensate draining pipe according to claim 1, wherein the condensate drain portion further comprises a draining nozzle.

9. The condensate draining pipe according to claim 1, wherein the condensate draining pipe further comprises a bushing adapted to accommodate a drain nozzle of the condensate drain portion.

10. The condensate draining pipe according to claim 1, wherein the press-fit coupling assembly further comprises a height adjustment fixing.

11. The condensate draining pipe according to claim 10, wherein the height adjustment fixing comprises slot fixing.

12. The condensate draining pipe according to claim 10, wherein the height adjustment fixing is attached to a sleeve flange fitting.

13. The condensate draining pipe according to claim 1, wherein the condensate feed portion is flexible.

14. The condensate draining pipe according to claim 1, wherein the condensate drain portion and a shaft fitting are rigid.

15. The condensate draining pipe according to claim 1, wherein the condensate feed portion extends between a HVAC module and a centre console of a vehicle.

16. The condensate draining pipe according to claim 1, wherein the condensate drain portion extends from a centre console of a vehicle to an opening in a body panel of the vehicle.

17. The condensate draining pipe according to claim 16, wherein the opening is positioned in a floor panel of the vehicle.

18. The condensate draining pipe according to claim 1, wherein the condensate drain portion is at least in part integral with a portion of vehicle bodywork.

19. The condensate draining pipe according to claim 18, wherein the condensate drain portion is at least in part integral with a foot well.

20. The condensate draining pipe according to claim 18, wherein the condensate drain portion is at least in part integral with a centre console.

21. A condensate draining pipe for at least one of a heating system, a ventilating systems, or air conditioning (HVAC) system, comprising:
    a condensate feed portion;
    a condensate drain portion; and a press-fit coupling assembly comprising an O-ring that connects the condensate feed portion and the condensate drain portion, a sleeve flange fitting comprising a groove in an inner surface thereof for accommodating a seal of the O-ring, and a shaft fitting coupled to an end of the condensate feed portion, the shaft fitting comprising a groove in its outer surface for accommodating a seal of the O-ring.

22. The condensate draining pipe according to claim 21, wherein the press-fit coupling assembly comprises a shaft fitting.

23. A condensate draining pipe for at least one of a heating system, a ventilating systems, or air conditioning (HVAC) system, comprising:
   a condensate feed portion comprises a feed flange adapted for connection to a condensate drain flange of a HVAC module of the air conditioning (HVAC) system, wherein the feed flange comprises a latch adapted to detachedly attach the condensate feed portion to the condensate drain flange of the HVAC module;
   a condensate drain portion; and
   a press-fit coupling assembly comprising an O-ring that connects the condensate feed portion and the condensate drain portion.

24. A condensate draining pipe for at least one of a heating system, a ventilating systems, or air conditioning (HVAC) system, comprising:
   a condensate feed portion;
   a condensate drain portion; and
   a press-fit coupling assembly comprising an O-ring that connects the condensate feed portion and the condensate drain portion and a height adjustment fixing.

25. The condensate draining pipe according to claim 24, wherein the height adjustment fixing comprises slot fixing.

26. The condensate draining pipe according to claim 24, wherein the height adjustment fixing is attached to a sleeve flange fitting.

* * * * *